UNITED STATES PATENT OFFICE.

LIVERAS HULL, OF CHARLESTOWN, MASSACHUSETTS.

IMPROVEMENT IN TREATING CAOUTCHOUC.

Specification forming part of Letters Patent No. 37,231, dated December 23, 1862.

*To all whom it may concern:*

Be it known that I, LIVERAS HULL, a citizen of the United States of America, and a resident of Charlestown, in the county of Middlesex and State of Massachusetts, have made a new and useful invention having reference to the treatment of ground caoutchouc and for the purpose of rendering it elastic or improving its elasticity, as well as imparting to such caoutchouc other useful properties; and I do hereby declare the same to be described as follows.

Caoutchouc, when ground by means of rollers, loses much of its original elasticity, which may be restored in a measure by the ordinary process of vulcanizing or mixing sulphur with the caoutchouc and submitting the mixture to a high degree of heat. My invention differs from the said vulcanizing process, as I employ no sulphur in mixture with the caoutchouc, nor do I require any high or even low degree of heat; but I make use of certain chemical liquids, simply dipping or immersing the caoutchouc for a very short period in the compound of them, or spreading it on them, and afterward suffering the surface or surfaces wet by the compound to dry.

In carrying out my invention I employ, in connection with chloride of sulphur, the light fluid termed in commerce "carbon spirits," whose specific gravity generally varies from 0.650 to 0.750. It is now made from the rock-oil which is produced from the oil-wells of Pennsylvania and Canada, and is a peculiar liquid differing in its properties from either benzine or benzole or coal-naphtha. It has been known only for the last two or three years. It differs from the liquids above named both in its physical and chemical characteristics—first, in its specific gravity; next, in its boiling-point; next, in its evaporating without leaving any residuum; next, in not being affected by the same chemical agents; next, in odor; next, in its special adaptation to forming a solvent of chloride of sulphur when to be used in the treatment of caoutchouc.

When coal-naphtha is mixed with chloride of sulphur the compound becomes turbid, and soon deposits a bulky mass dependent on the action of chloride of sulphur on one of the constituents of the naphtha. When the compound has been applied to caoutchouc this effect continues, and even after the chloride of sulphur has evaporated or become decomposed an adhesive matter remains in the caoutchouc.

In respect to benzole or benzine, when mixed with the chloride of sulphur and the mixture is applied to caoutchouc, the tendency of the benzole or benzine to rapidly form a solution with the caoutchouc causes the latter to become pulped or distended, so that the chloride of sulphur has to act on a larger mass, and to effect in an imperfect manner the changes which should follow its action. The employment of benzole in other ways has so increased its demand and raised its price as to render it too expensive a liquid to be employed practically and to economical advantage in the treatment of caoutchouc; but the carbon spirits, besides having all the advantages and useful properties of the benzole in its mixture with chloride of sulphur and the application thereof to caoutchouc, is productive of new, useful, and highly-important results—that is to say, it does not readily pulp the caoutchouc, as is the case with the benzine or benzole. Furthermore, it perfectly evaporates from the caoutchouc without leaving behind any body, adhesive or otherwise, calculated to injure it. Its remarkable or important character, in connection with chloride of sulphur, is that it provides for the decomposition of any excess of the chloride and removes it from the caoutchouc at the same time, and thus prevents the injury arising from its after action which has hitherto attended the use of the chloride of sulphur when employed in connection with caoutchouc. At the instant of application the carbon spirits exert a restraining action upon the chloride of sulphur, the latter having a disposition to destroy the texture of the caoutchouc. Alcohol has been used to restrain the action of the chloride of sulphur, but with imperfect results, and this after the caoutchouc has passed from a solution of the chloride with naphtha or other solvent. When naphtha and chloride of sulphur are mixed together the mixture must be used immediately; otherwise it becomes decomposed and changed; but a mixture of carbon spirits and chloride of sulphur may be suffered to stand for months without being used, and still will retain all its useful properties unimpaired. Furthermore, when naphtha or benzole or benzine is used in connection with the chloride of sulphur and in the treatment of caoutchouc a very disagreeable odor remains in the caoutchouc, which is not the case when carbon spirits are employed.

In the practical application of my invention to caoutchouc I take one measure of the chloride of sulphur to forty of the carbon spirits and mix them together. I do not, however, confine my invention to these precise proportions, as they may be somewhat varied and yet be productive of like results. Into the mixture or solution of the carbon spirits and chloride of sulphur I immerse the ground caoutchouc for about one minute, after which it should be removed and suffered to dry. The action of the mixture not only prevents the caoutchouc from becoming tacky, but neutralizes the tacky properties when present. It also restores the lost elasticity and imparts to the caoutchouc all the useful characteristics which it receives from the ordinary processes of vulcanizing, without any of their disadvantages.

I do not claim the application of coal-naphtha or sulphide of carbon and chloride of sulphur to caoutchouc; nor do I claim the application of benzine or benzole and chloride of sulphur to caoutchouc for the purposes for which such have been used.

I claim—

The application of carbon spirits, as described, and chloride of sulphur to ground caoutchouc, substantially as and for the improvement of it, as described.

In testimony whereof I have hereunto set my signature.

LIVERAS HULL.

Witnesses:
R. H. EDDY,
F. P. HALE, Jr.